United States Patent [19]
Bach

[11] Patent Number: 5,443,891
[45] Date of Patent: * Aug. 22, 1995

[54] LOW AMPLITUDE WAVE-BOARD

[75] Inventor: Lars Bach, Edmonton, Canada

[73] Assignee: Alberta Research Council, Edmonton, Canada

[*] Notice: The portion of the term of this patent subsequent to Sep. 10, 2008 has been disclaimed.

[21] Appl. No.: 213,329

[22] Filed: Mar. 15, 1994

Related U.S. Application Data

[63] Continuation of Ser. No. 658,791, Feb. 21, 1991, abandoned, which is a continuation-in-part of Ser. No. 365,307, Jun. 13, 1989, abandoned.

[51] Int. Cl.$^6$ .................. B32B 31/20; F04C 2/32
[52] U.S. Cl. .................. 428/182; 428/107; 428/213; 428/220; 428/326; 428/375; 428/401; 428/537.1; 428/541; 264/112; 264/119; 264/120; 264/295; 264/286; 264/505; 156/62.2; 156/196; 156/205; 156/219; 52/783.15; 52/798.1

[58] Field of Search ............... 428/182, 184, 167, 174, 428/179, 106, 107, 219, 220, 213, 220, 326, 325, 401, 537.1, 541; 264/112, 118, 119, 120, 295, 286, 505; 156/62.2, 196, 219, 205; 52/450, 795, 814

[56] References Cited

U.S. PATENT DOCUMENTS

| | | | |
|---|---|---|---|
| 4,284,676 | 8/1981 | Etzold | 428/167 |
| 4,372,899 | 2/1983 | Weimann et al. | 264/120 |
| 4,548,851 | 10/1985 | Greer | 428/332 |
| 4,610,900 | 9/1986 | Nishibori | 428/167 |
| 4,616,991 | 10/1986 | Bach et al. | 425/406 |
| 4,675,138 | 6/1987 | Bach et al. | 264/294 |
| 5,047,280 | 9/1991 | Bach | 428/182 |

*Primary Examiner*—Donald J. Loney
*Attorney, Agent, or Firm*—Bennett Jones Verchere

[57] ABSTRACT

A low amplitude wave-board panel having improved bending strength and bending stiffness properties is provided. More specifically, the amplitude of the waves is substantially equal to, or less than half the thickness of said board. Preferably, the wave amplitude ranges from between ⅛" to about 1".

9 Claims, 2 Drawing Sheets

LOW AMPLITUDE WAVE-BOARD

This is a continuation of application Ser. No. 07/658,791 filed on Feb. 21, 1991 now abandoned, which is a continuation-in-part of application Ser. No. 07/365,307 filed on Jun. 13, 1989, now abandoned.

FIELD OF THE INVENTION

The present invention relates to a low amplitude wood composite board panel having an undulating, or wave-like, configuration.

BACKGROUND OF THE INVENTION

Typically, a wafer board panel comprises layers of wood flakes or wafers formed into a composite structure using a resinous binder. The preparation of wafer board panels is complex, but broadly consists of two principal stages. The first stage comprises the preparation of the wafers and admixing thereof with the binder to form a loose layer or mat. The second stage involves subsequent compression and heating of the mat to cure the binder and form the consolidated panel.

At present, wafer board is usually manufactured in the form of planar or flat sheets. Wafer board is a recognized structural panel, finding wide application in the construction industry, particularly as a plywood substitute in residential construction.

Improvement in performance characteristics of flat wafer board panels has been attained by optimization of such parameters as wafer orientation, wafer geometry, resin selection and content, and the like.

By wafer orientation is meant orientation through a degree of rotation which may range from the longitudinal to the transverse directions. Furthermore the orientation may take place in a layered or non-layered manner. Stated otherwise, the outer faces of the board only may contain orientated wafers whereas the core may contain wafers in random orientation. Alternatively, the orientation may be such that all the layers throughout the board are consistently aligned in one direction.

After exhaustive optimization studies of planar wafer board panels it was postulated that its flexural strength characteristics could be improved if a corrugated configuration was imparted thereto. The fundamental concept of corrugating materials to thereby improve the structural properties is not a novel one. Indeed, corrugated wafer board panels per se have previously been manufactured in the industry. However, the wafer board panels prepared by these prior art techniques do not have the desired structural strength properties because they do not have a substantially uniform density.

Until recently, wafer board panels were manufactured in the form of planar or flat sheets. However, as disclosed in U.S. Pat. No. 4,616,,991 and 4,625,138, the present applicant has developed an apparatus and process for the manufacture of panels having a wave-like or corrugated configuration. Such waveboard panels have improved structural strength properties, relative to planar panels.

This prior patented apparatus involves a pair of opposed, spaced-apart, upper and lower platens. Each platen is formed of adjacent lengths of chain-like links. When the lengths are pushed inwardly from the side, they shift from a planar to an undulating corrugated form.

The process steps involved:

distributing a mat of loose wood wafers between the upper and lower platen surfaces while they are maintained in the planar configuration;

biasing the platens together to pre-compress the mat, and thereby substantially fixing the wafers together to limit their further relative movement;

converting the two platen surfaces, still in pressing association with the mat, from the planar to the corrugated configuration; and then applying additional pressure and heat for a sufficient time to cure the binder and produce a corrugated waveboard panel.

The main advantage inherent in the patented process was that the panel product so formed was characterized in having a substantially uniform density. This was achieved because the wafers were fixed by the pre-compression step and because the mat was not significantly stretched or elongated during the conversion from the planar to the corrugated configuration.

It will be also noted that the waferboard panel product formed using the particular mechanical assembly described hereabove has a generally sinusoidal configuration. The peaks and troughs of the panel have a generally rounded profile. Furthermore, it is to be noted that the panel prepared using this apparatus is characterized in having a high amplitude. By high amplitude is meant a wave amplitude wherein the amplitude of the board centre line is greater than half the panel thickness. The amplitude of the board centre line is defined as the maximum distance between the neutral axis ( or line of symmetry) and the board centre line.

Low amplitude is defined herein as that wherein the wave amplitude is equal to, or less than one half of the thickness of the panel.

By thickness is meant the distance between the upper surface and the lower surface.

Whilst the above-described apparatus provides a useful product it will be readily appreciated by one skilled in the art that the cost of manufacture of such corrugating platens is significant.

In summary, therefore, prior to the development of the present invention, it had been appreciated that by having a high amplitude wave-board prepared using the above-described platen assembly a marked improvement in mechanical performance characteristics of the panel was obtained. However, what had not been realised was that providing even a minor degree, or very low amplitude, of corrugation to the board would result in markedly improved properties as compared to a planar panel.

SUMMARY OF THE INVENTION

In accordance with the present invention a low amplitude wave-board panel having improved bending strength and bending stiffness properties is provided. More specifically, in order to obtain this improvement the wave amplitude must be substantially equal to or less than half of the thickness of said board. Preferably, the amplitude of said waves would range from between about ⅛" to about 1".

Preferably, the panels would be prepared from wood wafers in admixture with a binder.

Additionally, it has been observed that by substantially orientating or aligning the entire content of the wafers in a direction generally parallel to the profile of the wave-front it is possible to greatly increase the bending stiffness of the waveboard. Even partial alignment of the wafers has been found to increase the performance properties of the waveboard.

In a second aspect of the invention, it has been found that the low amplitude wave-board may be manufactured by the simple expedient of mounting suitably spaced elongate rectangular iron bars or the like, on both the upper and lower press platens. Thus, when the press is in the closed position the space between the working face of the iron bar and the surface of the press platen is twice the maximum amplitude of the low amplitude wave-board.

It is to be noted, however, that when utilizing such an assembly, the mat of wafers plus binder in admixture must be placed between a pair of flexible screen members or other flexible material before positioning between the platens. As a result of this provision, it is effectively possible to avoid major displacement or "stretching" of the wafers in the zone between corners of opposed upper and lower bars, which would otherwise take place.

The advantages arising from the present invention thus involve a product which can be relatively simply and inexpensively manufactured yet which exhibits marked improvement in performance characteristics.

Broadly stated, the invention comprises a waveboard panel formed by compression and curing of a mat of wafers and binder in admixture wherein the amplitude of said waves is substantially equal to or less than half of the thickness of said board.

DESCRIPTION OF THE PREFERRED EMBODIMENT

Having reference to the accompanying drawings there is shown at 1 the press system utilized to manufacture the low amplitude wave-board.

Figure 1A:
FIGS. 1a, 1b, 1c and 1d are a comparative illustration of the profiles of planar waferboard, low amplitude wave-board, low amplitude wave-board wherein the amplitude equals one half of the panel thickness and high amplitude wave-board respectively.
Figure 1B:
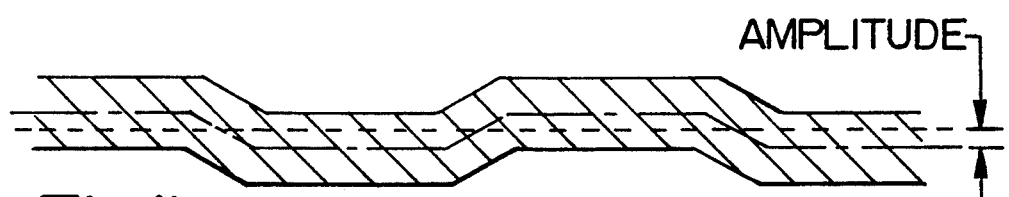
Figure 1C:
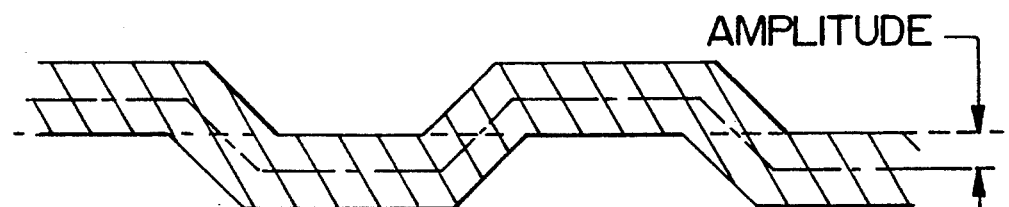
Figure 1D:
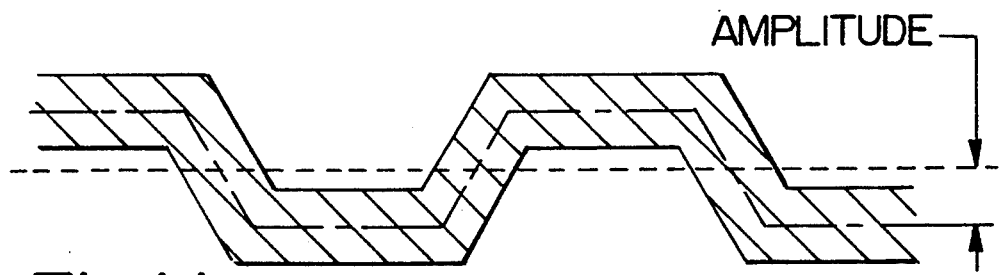
Figure 2:
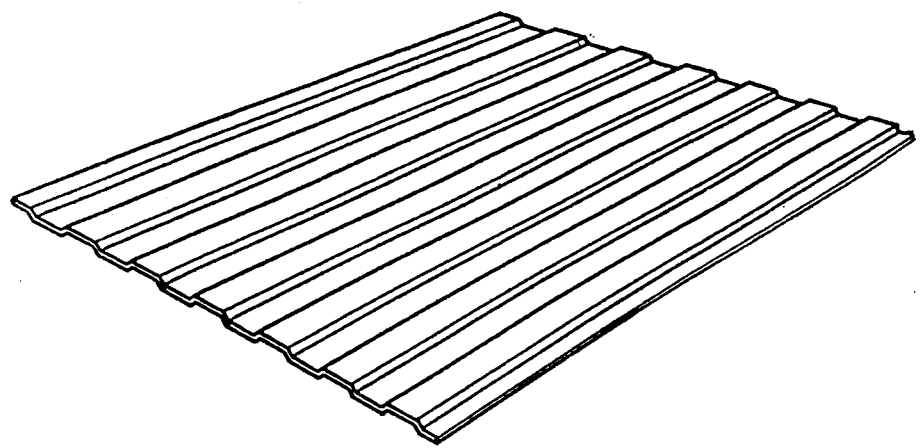
FIG. 2 is a perspective view of a finished waveboard panel.

As stated earlier, and exemplified in FIGS. 1b and 1c low amplitude is that wherein the wave amplitude is equal to or less than one half of the thickness of the panel.

More specifically, upper and lower platens 2a and 2b respectively, each include a base plate 3.

A plurality of spaced apart, parallel longitudinally extending rectangular bars 4 are affixed to the working surface of the base plates 3.

Figure 3A:
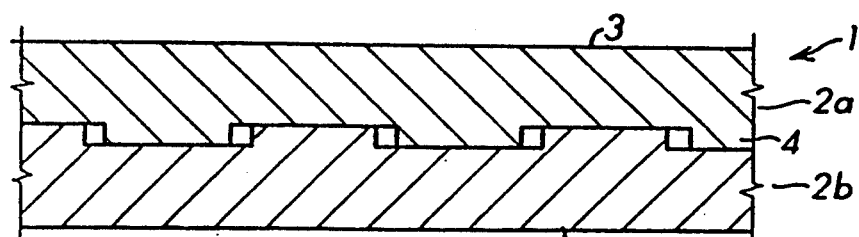
FIG. 3 is a schematic illustrating the press steps employed in the process of the present invention.
Figure 3B:
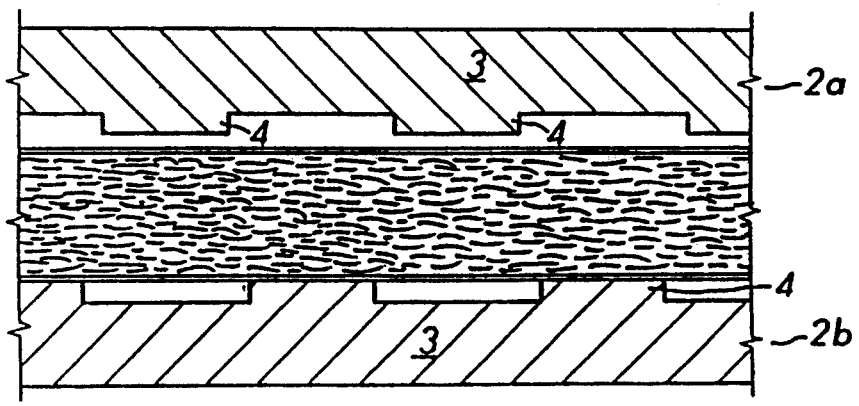
Figure 3C:
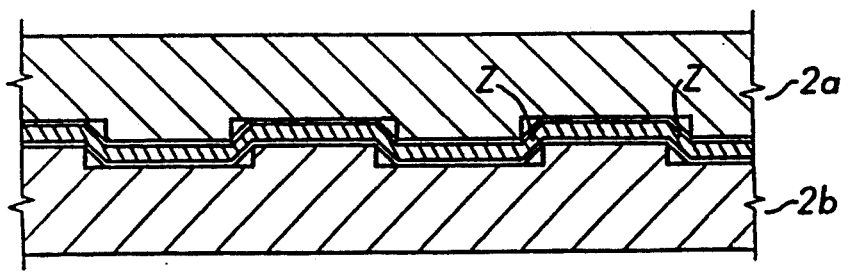

The horizontal platen assemblies are arranged in spaced apart opposed relationship as shown in FIG. 3. Conventional press member's (not shown) are connected to the platen assemblies 2, for biasing the latter together in a vertical direction and applying pressure thereto.

As would be evident to one skilled in the art, the waveboard may be manufactured to a variety of suitable materials, exemplary of which would be wood composite materials.

The process for producing the low amplitude waveboard from wood wafers was as follows:

The furnish could be prepared using various wood species. Aspen logs approximately 8" length and 6-14" in diameter were used. The logs were cleaned, debarked waferized and screened in accordance with conventional methods. The strand or wafer length could range from 1" to 48" long, but commonly would be ¼ to 6" long. The thickness of the wafers would be 0.025" to 0.25" thick. The width of the strands may range from 0.25" to 2.5" wide.

The moisture content of the furnish was reduced from the green state to about 5% using commercial dryers. The wafers were screened following drying.

At 5% moisture content, the furnish was blended with about 2% to 3% by weight of powdered phenol formaldehyde resin and 1% by weight wax in a drum blender. Wax was utilized to improve the moisture resistance of the panel. Resin was used as a binder for the wafers.

The wafers and wax/resin or binder, in admixture were arranged loosely between two flexible screens to form the mat. Alternatively and advantageously the wafers may be orientated (using methods conventional in the art) parallel to the profile of the wave-front. By arranging the wafers in this manner, I have determined that the bending stiffness of the panel may be approximately doubled, as shown in Table III herebelow.

The quantity of wafers and resin used was sufficient to produce a board having a density of 600-800 $kg/m^3$.

In order to avoid having areas of lower density in the panel in the zone marked "Z", I have determined that it is essential to uniformly spread the mat between flexible screens before placing it between the platens. Suitable screens could be manufactured from such exemplary materials as the high tension carbon steel mesh wire screen type #163 supplied by Gerald Daniel & Co. Inc., N.Y.

In the press, the mat was subjected simultaneously to high temperature, which cured the resin and to high pressure which compressed the mat to its specified thickness. The platen temperature was maintained at 205° C.

Table I given herebelow provides a comparison of the panel properties of the sinusoidal corrugated waferboard, low amplitude and planar waferboard illustrated in FIG. 1. The low amplitude panels were made using the male/female press platens illustrated in FIG. 3.

TABLE I

| Panel Properties | (Control) Flat waferboard | Low Amplitude wave-board |
|---|---|---|
| Panel density ($kg/m^3$) | 665 | 643 |
| Unit panel mass ($kg/m^2$) | 7.7 | 7.6 |
| Wavelength (mm) | — | 114 |
| Panel depth (mm) | 11.6 | 25 |
| Skin thickness (mm) | 11.6 | 11.6 |
| MC (%) | 3.6 | 3.9 |
| Unit max. moment (Nmm/mm) | 587 | 943 |
| Bending stiffness Unit E1 ($Nmm^2/mm$) | 724,000 | 2,460,000 |

All the panels were prepared in the above example using random oriented flakes. All panels were manufactured using 75 mm long aspen flakes of 0.75 mm thickness. The weight of powdered phenolic resin was 3%. Table II given herebelow shows the panel properties of two different density low amplitude wave-board panels compared to flat waferboard. The panels were prepared using the press platens and flexible screen system described herein. The wafer orientation was random.

TABLE II

| Panel Properties | (Control) Flat waferboard Normal Density | Low Amplitude wave-board High Density | Low Amplitude wave-board Normal Density |
|---|---|---|---|
| Panel density (kg/m$^3$) | 665 | 801 | 661 |
| Unit panel mass (kg/m$^2$) | 4.1 | 5.5 | 4.0 |
| Wavelength (mm) | — | 89 | 89 |
| Panel Depth (mm) | 6.2 | 12.7 | 12.7 |
| Skin Thickness (mm) | 6.2 | 6.8 | 6.1 |
| MC (%) | 3.3 | 3.6 | 4.1 |
| Unit max. moment (M max) (Load Capacity) (Nmm/mm) | 168 | 368 | 247 |
| Bending stiffness Unit EI (Nmm$^2$/mm) | 96,600 | 504,000 | 322,000 |

In Table III herebelow there is provided a comparison between low amplitude wave-board having strongly orientated wafers versus low amplitude wave-board having randomly orientated wafers. By "strongly" orientated wafers is meant that a major portion of the wafers, throughout its thickness, are orientated in one direction, specifically parallel to the major axis of the wavefront.

TABLE III

| Panel Properties | Low Amplitude Corrugated Waferboard | | | (Control) Flat Waferboard |
|---|---|---|---|---|
| Wafer Orientation* Relative to Test Span | Strong | Medium | Random | Random |
| Panel Density (kg/m$^3$) | 644 | 660 | 638 | 642 |
| Unit Panel Mass (Kg/m$^2$) | 4.1 | 4.1 | 4.0 | 4.2 |
| Wavelength (mm) | 89 | 89 | 89 | — |
| Panel Depth (mm) | 13.1 | 12.8 | 12.8 | 6.5 |
| Skin Thickness (mm) | 6.4 | 6.2 | 6.3 | 6.5 |
| MC (%) | 3.9 | 3.6 | 4.1 | 3.4 |
| Unit Max. Moment (load Capacity) (Nmm/mm) (M max) | 377 | 346 | 221 | 147 |
| Bending Stiffness (Nmm$^2$/mm) | 641,000 | 496,000 | 326,000 | 94,000 |
| Replications (—) | 8 | 4 | 8 | 8 |

*The wafer orientation for each panel was the same in face and core layers unlike that for commercial oriented flat waferboard.

THE EMBODIMENTS OF THE INVENTION IN WHICH AN EXCLUSIVE PROPERTY OR PRIVILEGE IS CLAIMED ARE DEFINED AS FOLLOWS:

1. A waveborad panel formed by compression and curing of a mat of wafers and binder in admixture, the waveboard panel comprising: a panel having a predetermined thickness; and, a plurality of waves defining an amplitude and a wavefront; wherein the amplitude of said waves is substantially equal to or less than half of the thickness of said board.

2. The panel as set forth in claim 1 wherein the amplitude of said waves range from between about $\frac{1}{8}"$ to about 1".

3. The panel as set forth in claim 2 wherein the wood wafers are from 1"–48" long, 0.025" to 0.25" thick and 0.25" to 2.5" wide.

4. The panel as set forth in claim 2 wherein said amplitude ranges from between about $\frac{1}{4}"$ to about $\frac{1}{2}"$.

5. The panel as set forth in claim 4 wherein said wafers are generally oriented parallel to an axis of the wave front.

6. The panel as set forth in claim 4 wherein said wafers are generally oriented perpendicular to an axis of the wave front.

7. The panel as set forth in claim 4 wherein the wood wafers are from 1"–48" long, 0.025" to 0.25" thick and 0.25" to 2.5" wide.

8. The panel as set forth in claim 1 wherein the wood wafers are from 1"–48" long, 0.025" to 0.25" thick and 0.25" to 2.5" wide.

9. A process for making a low amplitude wave-board panel comprising:
   distributing a mat of loose binder-coated wafers between a pair of flexible screen members and placing the latter between press platens, said platens forming a plurality of spaced elongate rectangular members functional to form a wave in said panel wherein the amplitude of the wave is substantially equal to or less than half of the thickness of said panel;
   biasing the platens together vertically to compress the mat between the working surfaces of the platens; and
   curing the resin to thereby provide a low amplitude waveboard panel.

* * * * *